(12) United States Patent
Wei et al.

(10) Patent No.: US 12,555,344 B2
(45) Date of Patent: Feb. 17, 2026

(54) METHOD AND APPARATUS FOR IMPROVING VIDEO TARGET DETECTION PERFORMANCE IN SURVEILLANCE EDGE COMPUTING

(71) Applicant: MOLCHIP TECHNOLOGY (SHANGHAI) CO., LTD., Shanghai (CN)

(72) Inventors: Hu Wei, Shanghai (CN); Zhiguo Tu, Shanghai (CN)

(73) Assignee: MOLCHIP TECHNOLOGY (SHANGHAI) CO., LTD., Shanghai (CN)

( * ) Notice: Subject to any disclaimer, the term of this patent is extended or adjusted under 35 U.S.C. 154(b) by 431 days.

(21) Appl. No.: 18/168,588

(22) Filed: Feb. 14, 2023

(65) Prior Publication Data
US 2023/0196705 A1    Jun. 22, 2023

Related U.S. Application Data

(63) Continuation of application No. PCT/CN2021/086314, filed on Apr. 11, 2021.

(30) Foreign Application Priority Data

Aug. 18, 2020   (CN) .......................... 202010828519.4

(51) Int. Cl.
*G06V 10/20*     (2022.01)
*G06T 3/40*      (2006.01)
(Continued)

(52) U.S. Cl.
CPC ................ *G06V 10/20* (2022.01); *G06T 3/40* (2013.01); *G06V 10/16* (2022.01); *G06V 10/809* (2022.01);
(Continued)

(58) Field of Classification Search
CPC .......... G06T 3/40; G06V 10/82; G06V 20/52; G06V 2201/07; G06F 18/213
See application file for complete search history.

(56) References Cited

U.S. PATENT DOCUMENTS

2020/0327691 A1* 10/2020 Linse ................. G06V 10/7515

FOREIGN PATENT DOCUMENTS

| CN | 103336951 A |   | 10/2013 |            |
|----|-------------|---|---------|------------|
| CN | 110781839 A | * | 2/2020  | G06F 18/23 |

(Continued)

OTHER PUBLICATIONS

CN-110781839-A (Machine Translation) (Year: 2020).*

*Primary Examiner* — Vu Le
*Assistant Examiner* — Zaid Muhammad Saleh
(74) *Attorney, Agent, or Firm* — Nitin Kaushik

(57) ABSTRACT

This application discloses a method and apparatus for improving video target detection performance in surveillance edge computing. This application relates to the technical field of digital image processing. The method includes: determine the size of multiple rectangular sliding windows for scanning according to the input size of the object detection neural network algorithm and the size of the original input image; when each frame is detected, the original input image and the sub-images in each rectangular sliding window are scaled in different proportions; the resolution of the scaled original input image is lower than that of the scaled sliding window sub-images; stitching the scaled images into a rectangular image and using it as a detection input image; the detection is performed by an object detection neural network algorithm corresponding to the size of the detection input image.

8 Claims, 4 Drawing Sheets

(51) Int. Cl.
*G06V 10/10* (2022.01)
*G06V 10/80* (2022.01)
*G06V 10/82* (2022.01)
*G06V 20/52* (2022.01)

(52) U.S. Cl.
CPC .............. *G06V 10/82* (2022.01); *G06V 20/52* (2022.01); *G06V 2201/07* (2022.01)

(56) References Cited

FOREIGN PATENT DOCUMENTS

| | | | |
|---|---|---|---|
| CN | 111488839 A | 8/2020 | |
| CN | 111709407 A | 9/2020 | |
| CN | 112084886 A | 12/2020 | |
| WO | WO-2020132920 A1 * | 7/2020 | ........... G06V 10/759 |

* cited by examiner

METHOD AND APPARATUS FOR IMPROVING VIDEO TARGET DETECTION PERFORMANCE IN SURVEILLANCE EDGE COMPUTING

CROSS-REFERENCE TO RELATED APPLICATIONS

The application claims priority to Chinese patent application No. 202010828519.4, filed on Aug. 18, 2020, the entire contents of which are incorporated herein by reference.

FIELD OF THE TECHNOLOGY

This application relates to the field of digital image processing, and specifically, to a method and apparatus for improving video object detection performance in surveillance edge computing.

BACKGROUND OF THE DISCLOSURE

With the rapid development of artificial intelligence and deep learning technology, the object detection method based on the convolutional neural network (CNN) algorithm has been widely used in the monitoring field. The commonly used object detection process is to slide the window from left to right and from top to bottom. Then it uses classification to identify objects. To detect different object types at different viewing distances, we can use windows of different sizes and aspect ratios (sliding windows). Among the object detection algorithms, commonly used methods such as RCNN, Fast RCNN and Faster RCNN are based on candidate regions and deep learning classification methods. From RCNN to Fast RCNN to Faster RCNN, mAP (mean Average Precision) is constantly refreshed. While other methods such as YOLO, SSD, DenseBox, etc. are deep-learning based regression methods, which improve performance to a very high frame rate. In the surveillance edge computing scenarios, such as IPC, NVR, DVR and other apparatuses, the computing power and bandwidth of current apparatuses are limited. In order to meet the frame rate requirements of real-time object detection, neural network algorithms such as SSD, YOLO, MobileNet_SSD, MTCNN, and DensNet with lower computing power requirements are often used on these apparatuses. However, even for these relatively low-complexity algorithms, at common video image resolutions (such as 1080P), their real-time detection computing power and bandwidth requirements still exceed the capabilities of most current hardware.

On the one hand, in order to solve the technical problem of insufficient computing power and bandwidth, the following methods are provided in the prior art. The first, and most common, is to simplify the neural network used by the algorithm (pruning and low-bit quantization). However, due to pruning and low-bit quantization, the accuracy of object detection often drops significantly, and the rate of missed detection and false detection increases significantly. And low-bit quantization is also limited by hardware support. The second method is to reduce the actual frame rate of object detection, only detect key frames, and use a low-complexity object tracking algorithm in non-key frames to make up for the problem of insufficient detection frame rate. However, this method may encounter the problem of missed detection and tracking error when the object moves fast. The third method is to sacrifice the detection distance of the algorithm. For example, deleting the last small-scale feature convolution layer of the SSD and other networks can reduce the computing power and bandwidth requirements. But it will reduce the maximum size of the object that can be detected, so that the face or human shape close to the camera cannot be detected. The fourth method is to reduce the input image and use a neural network algorithm with a small input size. However, this will reduce the resolution of the input image, limit the minimum size of the object that can be detected, and make it impossible to detect distant faces and human figures due to too few pixels.

On the other hand, in order to detect objects with different distances, the commonly used method in the prior art is to perform multi-scale scaling on the original input image, generate a multi-scale pyramid image group, and then detect the input images of different scales separately. When detecting near large-size objects, it is detected on a scale down image; when detecting distant objects, it is detected on a high-resolution large-size image. However, the design of above method is complicated, and the neural network needs to be designed and trained for each level of image scale, which puts forward high demands on the computing power and bandwidth of the equipment.

To sum up, the existing low-complexity optimization methods cannot be comprehensive in terms of detection accuracy, frame rate, farthest and nearest detection distances, etc. They are only suitable for specific application scenarios. However, the actual surveillance application scenarios are complex. The surveillance equipment not only needs to meet a high object detection accuracy, but also needs a sufficient frame rate to detect fast-passing objects. It also needs to detect nearby large-scale objects and distant small-scale objects. The objects should be detected both when the object is close to the camera or when it passes far away. How to improve the accuracy, the detection distance and the frame rate performance, etc. are technical problems that need to be solved urgently.

SUMMARY

The purpose of the application is to overcome the deficiencies of the prior art, and to provide a method and apparatus for improving video object detection performance in surveillance edge computing. The invention takes advantage of the difference in the size of the motion vector of the detection object in the distance and the near position in the surveillance video image. It combines the low frame rate detection of the distant small object and the high frame rate detection of the near object. And it uses the stitched image to adapt the characteristics of the detection neural network with a fixed input scale. The computing power and bandwidth requirements are reduced, and the object detection distance is optimized.

To achieve the above-mentioned goals, the application provides the following technical solutions.

A method for improving video object detection performance in surveillance edge computing, the method comprising:
  determine the size of multiple rectangular sliding windows for scanning according to the input size of the object detection neural network algorithm and the size of the original input image, the rectangular sliding windows can be moved to different positions on the original input image frame by frame according to preset scanning rules;
  when each frame is detected, the original input image and the sub-images in each rectangular sliding window are scaled in different proportions, and the resolution of the scaled original input image is lower than that of the scaled sliding window sub-images;

stitching the scaled images into a rectangular image and using it as a detection input image;

the detection is performed by an object detection neural network algorithm corresponding to the size of the detection input image.

Further, it also includes the step of combining and mapping the detection results of each sliding window sub-image onto the original input image.

Further, the steps of determining the size of multiple rectangular sliding windows for scanning according to the input size of the object detection algorithm and the original input image size are as follows:

step 110, determine the input size of the object detection neural network algorithm used according to the computing power of the current equipment, and the minimum detection size and maximum detection size of the object that the algorithm can detect under the corresponding input size;

step 120, according to the input size, the input rectangle of the detection neural network algorithm is divided into a plurality of rectangular sub-image areas, each rectangular sub-image area is greater than or equal to the minimum detection size that the algorithm can detect; the rectangular sub-image area includes a full-image mapping sub-image area and the sliding window mapping sub-image area, the aspect ratio of the full-image mapping sub-image area is the same as the aspect ratio of the original input image for displaying the original input image reduced to a low resolution, and the sliding window mapping sub-image area is used to display the corresponding sliding window sub-image;

wherein, the segmentation steps of each rectangular sub-image area are as follows:

step 121, determine the size of the full-image map sub-image area on the input rectangle of the detection algorithm, comprising: according to the size of the object with the closest detection distance L0 on the original input image, select an initial scaling ratio so that the scaled size of the closest object on the original input image is less than or equal to the maximum detection size that the algorithm can detect, so the closest object can be detected on the full-image mapping sub-image area, and at the same time, enough space is left for each sliding window mapping sub-image area, after the scaling ratio is determined, the farthest detection distance L1 that can be detected in the full-image map area is also determined;

step 122, in the remaining space, select a rectangular size area as a sliding window mapping sub-image area, so that the object at the distance L1 on the original input image can fall within the sliding window mapping sub-image area after being scaled, and can be detected by the detection algorithm; adjust the scale ratio so that the object with the farthest detection distance L2 on the original input image can be detected;

step 123, repeat step 122 to determine the size of other sliding window mapping sub-image areas, and the farthest detection distance is gradually expanded until there is no suitable space to be set as the sliding window mapping sub-image area;

step 124, repeat step 121 to 123 to adjust the size of each rectangular sub-image area and the corresponding scale ratio to maximize the detection distance.

Further, in step 122, the time for the object with the farthest detection distance L2 to stay on the original image is longer than one round of scanning time of the sliding window.

Further, the sizes and/or aspect ratios of the plurality of rectangular sliding windows are different;

and, the preset scanning rule is to scan the whole image at a constant speed from left to right and from top to bottom, or scan the whole image according to a random movement rule, or scan the whole image in an order specified by the user.

Further, acquire the detection results of each sliding window sub-image, and adaptively adjust the moving speed and/or the dwell time during scanning of the rectangular sliding window according to the detection results.

The application also provides a apparatus for improving video object detection performance in surveillance edge computing, including the following structures:

a sliding window setting unit configured to determine the size of multiple rectangular sliding windows according to the input size of the object detection neural network algorithm and the original input image size, the rectangular sliding window can be moved to different positions on the original input image by frame according to the preset scanning rule;

an image preprocessing unit connected with the sliding window setting unit, the image preprocessing unit is configured to scale the original input image and the sliding window sub-images in each rectangular sliding window according to different proportions, the resolution of the scaled original input image is lower than that of the sliding window sub-images, and splicing each scaled image into a rectangular input image and use it as a detection input image;

an object detection unit connected with the sliding window setting unit and the image preprocessing unit, the object detection unit is configured to detect the detection input image by using the object detection neural network algorithm corresponding to the input scale.

Further, it also includes a result display unit, the result display unit is configured to combine and map the detection results of each sliding window sub-image to the original input image to display the output.

Further, the sliding window setting unit including an input size determining unit and a rectangular sub-image area dividing unit:

wherein, the input size determination unit is configured to: determine the input size of the object detection neural network algorithm adopted according to the computing power of the current apparatus, and the minimum detection size and the maximum detection size that the algorithm can detect the object under the corresponding input size;

and, the rectangular sub-image area dividing unit is configured to: according to the input size, divide the input rectangle of the detection neural network algorithm into a plurality of rectangular sub-image areas, each rectangular sub-image area is greater than or equal to the minimum detection size that can be detected by the algorithm; the rectangular sub-image area includes a full-image mapping sub-image area and some sliding-window mapping sub-image areas; the aspect ratio of the full-image mapping sub-image area is the same as that of the original input image for displaying the original input image reduced to a low resolution, the sliding window mapping sub-image area is used to display the corresponding sliding window sub-image;

wherein, the segmentation steps of each rectangular sub-image area are as follows:

step 121, determine the size of the full-image map sub-image area on the input rectangle of the detection algorithm, comprising: according to the size of the object with the closest detection distance L0 on the original input image, select an initial scaling ratio so that the scaled size of the closest object on the original input image is less than or equal to the maximum detection size that the algorithm can detect, so the closest object can be detected on the full-image mapping sub-image area, and at the same time, enough space is left for each sliding window mapping sub-image area, after the scaling ratio is determined, the farthest detection distance L1 that can be detected in the full-image map area is also determined;

step 122, in the remaining space, select a rectangular size area as a sliding window mapping sub-image area, so that the object at the distance L1 on the original input image can fall within the sliding window mapping sub-image area after being scaled, and can be detected by the detection algorithm; adjust the scale ratio so that the object with the farthest detection distance L2 on the original input image can be detected;

step 123, repeat step 122 to determine the size of other sliding window mapping sub-image areas, and the farthest detection distance is gradually expanded until there is no suitable space to beset as the sliding window mapping sub-image rea;

step 124, repeat step 121 to 123 to adjust the size of each rectangular sub-image area and the corresponding scale ratio to maximize the detection distance.

Further, the sizes and/or aspect ratios of the plurality of rectangular sliding windows are different;

and, the preset scanning rule is to scan the whole image at a constant speed from left to right and from top to bottom, or scan the whole image according to a random movement rule, or scan the whole image in an order specified by the user.

Compared with the prior art, the application has the following advantages and positive effects: utilizing the feature of the difference in the size of the motion vector of the detected object in the distance and near in the surveillance video image, combining the low frame rate detection of distant small objects and the high frame rate detection of near objects, and constructing a stitched image by splicing low-resolution images and high-resolution images, it can ensure the detection of near objects, and can also scan and detect distant objects. The detection neural network that uses the stitched image to adapt to the fixed input scale can simplify the algorithm design complexity and improve the effective computing power, reduce the computing power and bandwidth requirements of the object detection algorithm on the monitoring edge computing apparatus, and optimize the object detection distance.

Compared with the existing multi-scale object detection methods, on the one hand, the multi-scale object detection methods often need to detect input images with multi-level resolutions from high to low, and the computing power and bandwidth required for calculation are large. It can only be used for small input size object detection algorithms to achieve an approximate detection distance, especially suitable for surveillance edge computing application scenarios where computing power and bandwidth are limited. On the other hand, the commonly used multi-scale detection method based on neural network needs to design a corresponding network for each input scale, which is more complicated to design and train the network, while the application can only use a fixed input scale, which significantly simplifies the neural network training and design complexity. On the other hand, when the aspect ratio of the original input image and the neural network input size is inconsistent, the existing method of adding black borders will waste computing power and bandwidth, and the method proposed in the application can make full use of the hardware performance not only improves the detection capability of the object detection apparatus, but also improves the utilization efficiency of the computing power of the apparatus.

DESCRIPTION OF REFERENCE NUMERALS

Figure 1:
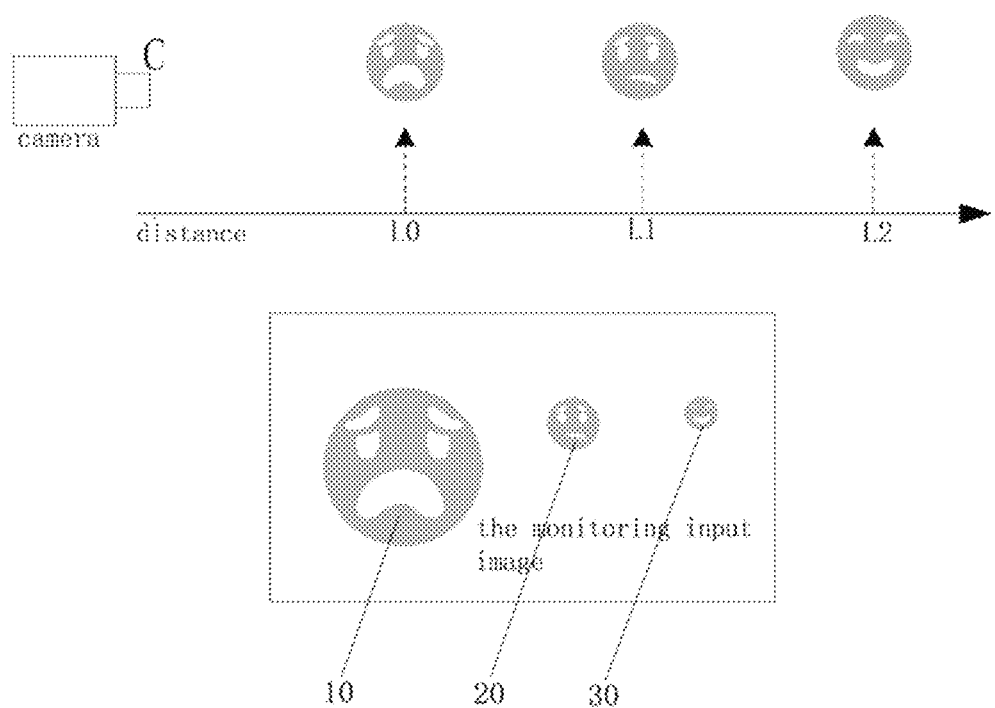
FIG. 1 is an example of the relationship between the size of the object on the input image and the distance provided by the application.

Large size face 10, medium size face 20, small size face 30; original input image 100, detection input image 200, black border 300.

DETAILED DESCRIPTION

The method and apparatus for improving video object detection performance in surveillance edge computing disclosed in the application will be further described in detail below with reference to the accompanying drawings and specific embodiments. It should be noted that the technical features or combinations of technical features described in the following embodiments should not be considered isolated, and they can be combined with each other to achieve better technical effects. In the drawings of the following embodiments, the same reference numerals appearing in the various drawings represent the same features or components, which may be used in different embodiments. Therefore, once an item is defined in one figure, it need not be discussed further in subsequent figures.

It should be noted that the structures, proportions, sizes, etc. shown in the accompanying drawings in this specification are only used to cooperate with the contents disclosed in the specification, so as to be understood and read by those who are familiar with the technology, and are not used to limit the invention. The limited conditions for implementation, any structural modifications, changes in proportional relationships or adjustments in size, shall fall within the scope of the technical content disclosed in the invention without affecting the efficacy and purpose of the invention, within the range. The scope of the preferred embodiments of the application includes alternative implementations in which the functions may be performed out of the order described or discussed, including performing the functions in a substantially simultaneous manner or in the reverse order depending upon the functions involved, which should be Embodiments of the invention will be understood by those skilled in the art to which the embodiments of the invention pertain.

Techniques, methods, and apparatus known to those of ordinary skill in the relevant art may not be discussed in detail, but where appropriate, such techniques, methods, and apparatus should be considered part of the authorized description. In all examples shown and discussed herein, any specific value should be construed as illustrative only and not as limiting. Accordingly, other examples of exemplary embodiments may have different values.

EMBODIMENTS

According to the optical principle of surveillance cameras, the scale (length/width) of the same object imaged on the camera CCD (charge coupled apparatus) is inversely proportional to the distance from the object to the lens, that is, it is inversely proportional to the distance from the object to the lens. The size of the video frame and the speed of plane movement (motion vector) in the video frame follow the principle of being inversely proportional to the distance from the object to the lens. Therefore, if the same detection object moves at the same speed, in the shooting video, the near motion vector will be relatively large (reflected in the faster moving speed on the screen), and the motion vector of the distant object will be relatively small (reflected in the slower moving speed on the screen). This phenomenon of "near big and far small" and "near fast and far slow" is the internal principle of the camera. As shown in FIG. 1, in the surveillance video, the size of the detection object in the vicinity is relatively large, and its motion vector is relatively large in the video, and the object moves faster on the screen, which requires a higher detection frame rate to avoid missing detection. While the distant detection object is relatively small in size in the image, and its motion vector is relatively small in the video, and the object moves slowly on the screen, so a lower detection frame rate can be used for detection.

It should be noted that the size of the motion vector of the detected object in the distance and near is different in the video image, which is based on the above-mentioned objective laws of "near big and far small" and "near fast and far slow". The larger the motion vector of the object in the near distance is relative to the small motion vector in the far distance, the specific motion vector size The values should not be taken as limitations of the invention.

The detection object, by way of example and not limitation, may be a human face, a human shape, a car model, or the like. FIG. 1 exemplifies the method of using the face as the detection object. There are 3 detection objects displayed in the monitoring input image, which are the large-sized near face with a distance of L0, the medium-sized distant face with a distance of L1, and the distance between the small size and the farther face is L2, and the distance between the three and the camera increases in turn.

Figure 2:
FIG. 2 is an example of filling black borders on an input image of a detection algorithm of the prior art.
Figure 2:
Figure 2:

On the other hand, for the detection algorithm based on neural network, its parameters and network structure often correspond to the specified input size. The size of the detected input image cannot be adjusted arbitrarily. Every time the input size is changed, the network design and training may need to be redesigned. In most cases, the original input image does not match the detection input size. If the aspect ratio of the image is forcibly changed for scaling, the accuracy of object detection may be reduced. Therefore, it is often necessary to expand the original input image with black borders to adapt to the input aspect ratio size requirements of the detection network, as shown in FIG. 2. The size of the input image 100 is 1920*1080 (length*width), the size of the detection input image 200 is 320*240 (length*width), and the lower part of the detection input image 200 is a black border 300. Participating in the calculation of these black border images actually wastes computing power and bandwidth. If the black border area is replaced with image content, the computing power can be fully utilized to improve the detection performance.

Figure 3:
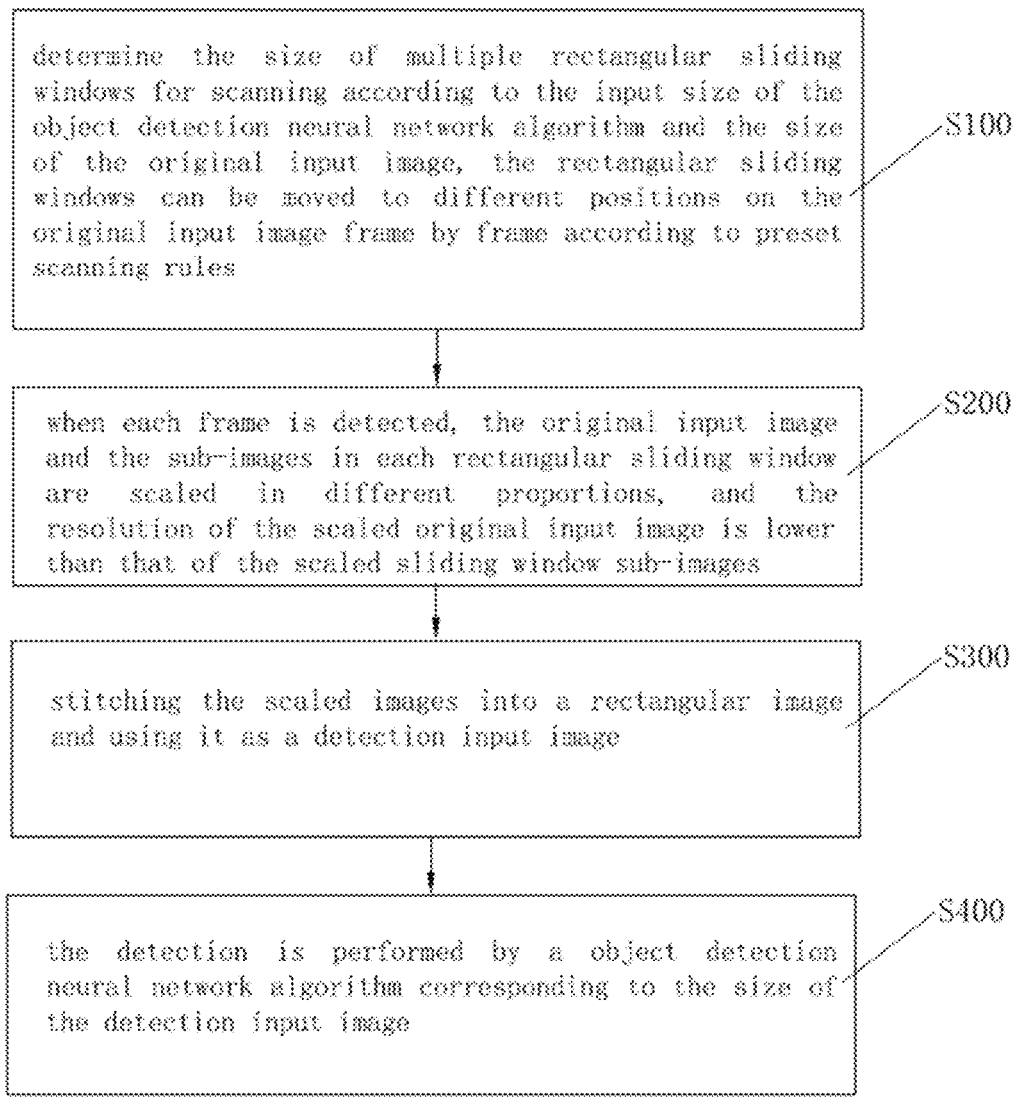
FIG. 3 is a flowchart of a method for improving video object detection performance in surveillance edge computing according to an embodiment of the application.

Based on the above principles, the application provides a method for improving video object detection performance in monitoring edge computing. Referring to FIG. 3, the method includes the following steps:

S100, the size of multiple rectangular sliding windows for scanning is determined according to the input size of the object detection neural network algorithm and the size of the original input image. The rectangular sliding windows can be moved to different positions on the original input image frame by frame according to preset scanning rules.

S200, during each frame detection, the original input image and the sliding window sub-images in each rectangular sliding window are scaled in different proportions, and the resolution of the scaled original input image is lower than that of the sliding window sub-image.

S300, the scaled images are stitched into a rectangular input image and used as the detection input image.

S400, the detection input image is detected by the aforementioned object detection neural network algorithm.

The step of S400 may further include the following steps: merging and mapping the detection results of each sliding window sub-image onto the original input image for display and output.

In the technical solution provided by the application, by presetting various rectangular sliding windows of different sizes or aspect ratios, the rectangular sliding windows can be moved to different positions on the original input image frame by frame according to the set rules. When detecting each frame, the original input image and the sliding window sub-images in each rectangular sliding window are firstly scaled in different proportions. The original input image is scaled down to a lower resolution, while the sliding window sub-image maintains a higher resolution. Then, the scaled images are spliced into a rectangular input image whose size is smaller than the original input image, which is used as the detection input image; finally, the neural network object detection algorithm corresponding to the input scale is used to detect the detection input image, and the graph detection results are merged and mapped onto the original input graph. In the above technical solution, the stitched image as the detection input image includes a low-resolution full-map sub-image and a high-resolution sliding window sub-image. During detection, each frame of the low-resolution full-map sub-image will be detected, so the detection frame rate is high, and nearby objects can be found on the lower-resolution full-map sub-image. While the high-resolution sliding window sub-image, only a part of the whole high-resolution image is detected in each frame, and the sliding window moves in each frame. It takes several frames to complete a round of scanning, that is, the same local area can only be detected again on the high-resolution sub-image after several frames. The sliding window sub-image detection is low frame rate, and this sub-image resolution can be used to detect distant objects. Due to the small size and slow motion of distant objects in the image, even if the detection window is small and the detection frame rate is low, it is next to impossible to miss detection. Multiple sliding windows are combined. Each sliding window can correspond to different resolutions and scanning periods, and to different detection distances. In this way, the low frame rate detection of distant small objects can be combined with the high frame rate detection of near objects. In this way, the detection of nearby objects can be ensured, and at the same time, small objects in the distance can be detected by scanning. At the same time, the use of stitched images to adapt the detection neural network with a fixed input scale can simplify the algorithm design complexity and improve the effective computing power. So that the detection neural network algorithm with smaller input size can also realize real-time detection of monitoring extremely far and extremely close objects. This improves the accuracy of object detection, detection distance, and frame rate performance on edge computing apparatuses, and reduces missed and false detection rates.

In this embodiment, preferably, the step of determining the size of multiple rectangular sliding windows for scanning according to the input size of the object detection neural network algorithm and the size of the original input image is as follows:

Step 110, determine the input size of the object detection neural network algorithm used according to the computing power of the current equipment, and the minimum detection size and maximum detection size of the object that the algorithm can detect under the corresponding input size.

Step 120, according to the input size, the input rectangle of the detection neural network algorithm is divided into a plurality of rectangular sub-image areas. And each rectangular sub-image area is greater than or equal to the minimum detection size that the algorithm can detect. The rectangular sub-image area includes a full-image mapping sub-image area and the sliding window mapping sub-image area. The aspect ratio of the full-image mapping sub-image area is the same as the aspect ratio of the original input image for displaying the original input image reduced to a low resolution. And the sliding window mapping sub-image area is used to display the corresponding sliding window sub-image.

The segmentation steps of each rectangular sub-image area are as follows:

Step 121, determine the size of the full-image mapping sub-image area on the input rectangle of the detection algorithm. According to the size of the object with the closest detection distance L0 on the original input image, an initial scaling ratio is selected so that the closest object on the original input image after scaling is less than or equal to the maximum detection size that the algorithm can detect. In this way, the closest distance object is detected on the full-image mapping sub-image area, and at the same time, enough space is left for each sliding-window mapping sub-image area. After the scaling ratio of the original input image to the full-image mapping sub-image area is determined, the farthest detection distance L1 that can be detected on the full-image mapping sub-image area is also determined.

Step 122, in the remaining space, a rectangular-sized area is selected as a sliding window mapping sub-image area, so that the object at the distance L1 on the original input image can fall within the sliding window mapping sub-image area after being scaled, and can be detected by the detection algorithm. Adjust the scale ratio so that the object with the farthest detection distance L2 on the original input image can be detected.

Step 123, repeat step 122 to determine the size of other sliding window mapping sub-image areas, and the farthest detection distance is gradually expanded until there is no suitable space to be set as the sliding window mapping sub-image area.

Step 124, repeat steps 121 to 123 to adjust the size of each rectangular sub-image area and the corresponding scale ratio to maximize the detection distance.

The rectangular sub-image area segmentation method proposed by the application, gradually determine the sub-image size and scale ratio corresponding to the object within each distance range, from near to far, according to the corresponding relationship between the distance of the object and its size on the original input image, and the constraint between the time the object stays in the image and the scanning period of the sliding window.

In this embodiment, the sizes and/or aspect ratios of the plurality of rectangular sliding windows may be different.

Scanning rules can be set by default, or can be customized by users according to their needs.

Optionally, the preset scanning rule is: scan the whole image at a constant speed from left to right and from top to bottom, or scan the whole image according to the random movement rule, or scan the whole image according to the order specified by the user. Further, the detection results of each sliding window sub-image can also be obtained, and the moving speed and/or the dwell time during scanning of the rectangular sliding window can be adaptively adjusted according to the foregoing detection results.

In the following, the implementation steps of the application will be described in detail with reference to FIG. 4 by taking the setting of two rectangular sliding windows as an example.

Step 1, determine the input size of the object detection neural network algorithm used according to the current equipment computing power, and the minimum detection size and maximum detection size of the object that the algorithm can detect under the corresponding input size.

Figure 4:
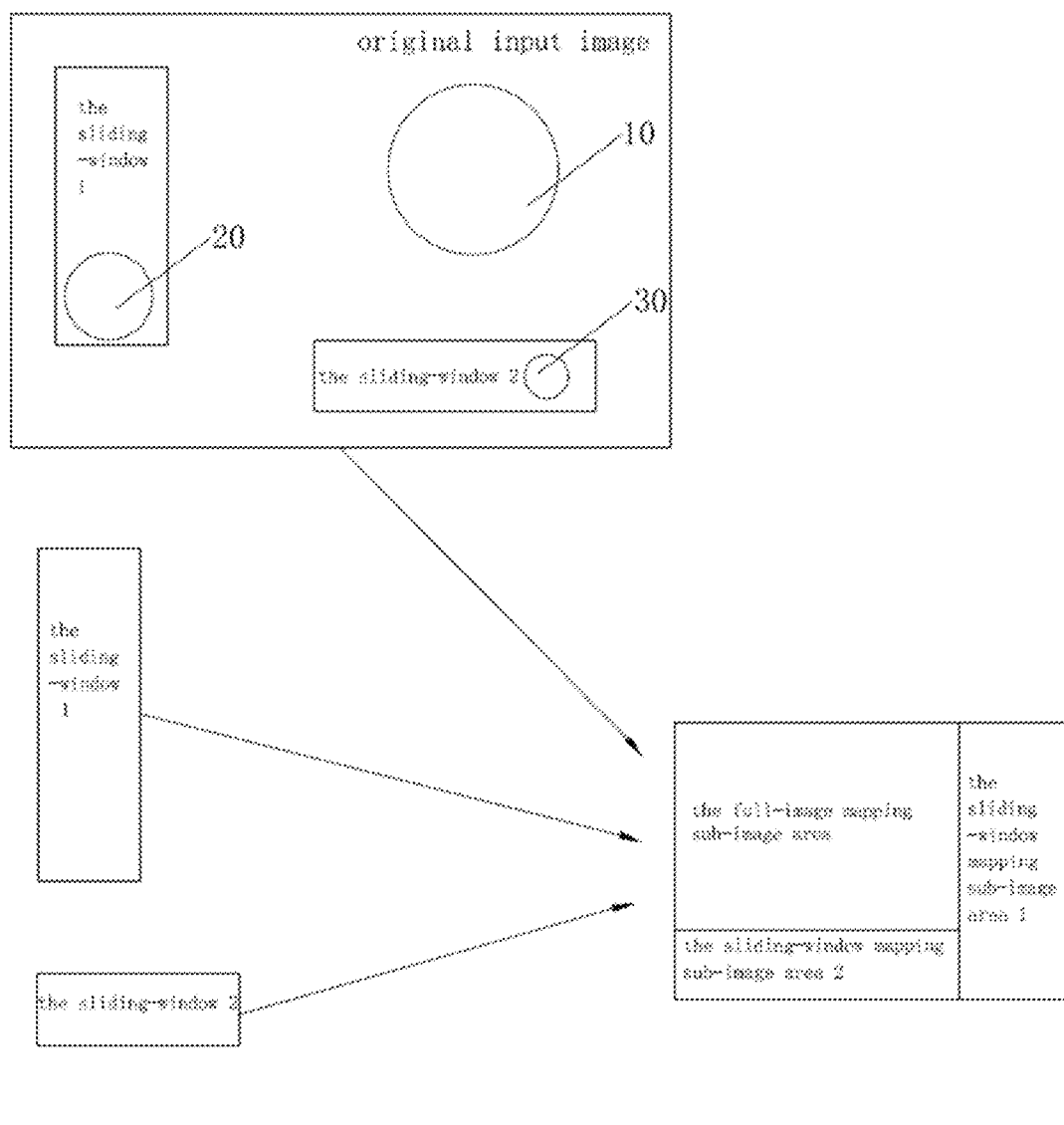
FIG. 4 is an operation example of generating the detection input image by scaling and splicing the original input image and the sliding window image in the embodiment of the application.

Step 2, according to the input size of the given detection neural network, the detection input rectangle is divided into several rectangular sub-image areas, as shown in FIG. 4. In the example, it is divided into 3 rectangular sub-image areas, and each rectangular sub-image area should be greater than or equal to the minimum detection size that the algorithm can detect. The aspect ratio of one sub-image area remains the same as that of the original input image, which is the full-image mapping sub-image area, which is used to display the full-image mapping sub-image. The remaining two rectangular sub-image areas are called sliding-window mapping sub-image areas, and are used to display sliding-window sub-images.

The size of the full-image mapping sub-image area corresponds to a certain scale ratio of the original input image. Therefore, the size of the area corresponds to a certain size range in which the object on the original input image can be detected. That is, it corresponds to the object within a certain distance range from the camera.

The steps for dividing each rectangular sub-image area are as follows:

Step 21, First, determine the size of the full-image mapping sub-image area on the input rectangle of the detection algorithm. According to the size of the object with the nearest detection distance L0 on the original input image, an appropriate initial scaling ratio is selected. So that the nearest object on the original input image after scaling is smaller than or equal to the maximum object size that the algorithm can detect. So, the nearest object can be detected on the full-image mapping sub-image area, and at the same time enough space is left for each sliding window mapping sub-image area. After the scaling ratio of the original input image is determined, the farthest detection distance L1 on the full-image mapping sub-image area is also determined, that is, the scaled object size of distance L1 correspond to the minimum detection size on the full-image mapping sub-image area.

Step 22, Then, in the remaining space, select an appropriate rectangular size area as a sliding window mapping sub-image area. After scaling down the object with a distance of L1 on the original input image, it can fall within the sliding window mapping sub-image area, and can be detected by the detection algorithm (that is, greater than or equal to the minimum detection size). According to the scaling ratio, this sliding window mapping sub-image area corresponds to a sliding window area of a certain size on the original input image. The sliding window moves every frame according to the set rules, and scans the full image of the original input image within a certain period. Next, adjust the scale ratio so that the object with the farthest detection distance L2 on the original input image can be detected (that is, the object at the distance L2 is smaller than or equal to the minimum detection size, and the object at the distance L2 stays on the original input image for longer than one scan time of the sliding window).

The rules for moving the sliding window (that is, the scanning rules) can be to scan the entire image from left to right and from top to bottom at a constant speed, or to scan the entire image in a specific order, or to scan the entire image according to random movement rules. Further, the moving speed or dwell time of the sliding window can also be adaptively adjusted according to the detection result.

Step 23, determine the size of other sliding window mapping sub-image areas in turn. Repeat step 22 to gradually expand the farthest detection distance until there is no suitable space for setting the sliding window mapping sub-image area.

Step 24, adjust the size of each sub-image area and the corresponding zoom ratio to make the detection distance farthest. Going back to the process from step 21 to step 23, adjust the size and zoom ratio of each sub-image area so that the detection distance is the farthest.

Step 3, when detecting each frame, the original input image and the sub-images of each sliding window position are scaled respectively. The scaled images are then stitched into a rectangular input image, which is used as a detection input image, as shown in FIG. 4.

Step 4, finally, the corresponding neural network object detection algorithm is used to detect the detection input image, and the detection results of each sub-image are combined and mapped to the original input image.

The above method reduces the original input image to a lower-resolution full-image mapping sub-image, and uses a high frame rate to detect nearby objects. While each sliding window sub-image maintains a higher resolution and uses a lower frame rate to detect distant objects. Therefore, when the surveillance edge computing apparatus uses the neural network object detection algorithm with small input size, it can detect near and far objects as much as possible.

The method provided by the application is to form a rectangular input image by splicing a full-image mapping sub-image and some sliding window sub-images as a detection input image and send it to an object detection neural network algorithm for detection, which can also significantly improve the object detection performance under different depths of field and blur levels.

Another embodiment of the application also provides an apparatus for improving video object detection performance in surveillance edge computing.

The apparatus includes a sliding window setting unit, an image preprocessing unit and an object detection unit.

The sliding window setting unit is configured to determine the size of multiple rectangular sliding windows according to the input size of the object detection neural network algorithm and the original input image size, the rectangular sliding window can be moved to different positions on the original input image by frame according to the preset scanning rule.

The image preprocessing unit is connected with the sliding window setting unit, and the image preprocessing unit is configured to scale the original input image and the sliding window sub-images in each rectangular sliding window according to different proportions, the resolution of the scaled original input image is lower than that of the sliding window sub-images, and splicing each scaled image into a rectangular input image and use it as a detection input image.

The object detection unit is connected with the sliding window setting unit and the image preprocessing unit, and the object detection unit is configured to detect the detection input image by using the object detection neural network algorithm corresponding to the input scale.

The apparatus may further include a result display unit, through which the detection results of each sliding window sub-image can be combined and mapped to the original input image for display and output.

In this embodiment, the sliding window setting unit may specifically include an input size determination unit and a rectangular sub-image area division unit.

Wherein, the input size determination unit is configured to: determine the input size of the object detection neural network algorithm adopted according to the computing power of the current apparatus, and the minimum detection size and the maximum detection size that the algorithm can detect the object under the corresponding input size.

And, the rectangular sub-image area division unit is configured to: according to the input size, divide the input rectangle of the detection neural network algorithm into a plurality of rectangular sub-image areas, and each rectangular sub-image area is greater than or equal to the minimum detection size that can be detected by the algorithm. The rectangular sub-image area includes a full-image mapping sub-image area and some sliding-window mapping sub-image areas. The aspect ratio of the full-image mapping sub-image area is the same as that of the original input image for displaying the original input image reduced to a low resolution. The sliding window mapping sub-image area is used to display the corresponding sliding window sub-image.

Optionally, the segmentation steps of each rectangular sub-image area are as follows:

Step 121, Determine the size of the full-image map sub-image area on the input rectangle of the detection algorithm, comprising: according to the size of the object with the closest detection distance L0 on the original input image, select an initial scaling ratio so that the scaled size of the closest object on the original input image is less than or equal to the maximum detection size that the algorithm can detect, so the closest object can be detected on the full-image mapping sub-image area, and at the same time, enough space is left for each sliding window mapping sub-image area, after the scaling ratio is determined, the farthest detection distance L1 that can be detected in the full-image map area is also determined.

Step 122, in the remaining space, select a rectangular size area as a sliding window mapping sub-image area, so that the object at the distance L1 on the original input image can fall within the sliding window mapping sub-image area after being scaled, and can be detected by the detection algorithm. Adjust the scale ratio so that the object with the farthest detection distance L2 on the original input image can be detected.

Step 123, repeat step 122 to determine the size of other sliding window mapping sub-image areas, and gradually expand the farthest detection distance until no suitable space is available to set the sliding window mapping sub-image areas.

Step 124, repeat step 121 to 123 to adjust the size of each rectangular sub-image area and the corresponding scale ratio to maximize the detection distance.

In this embodiment, the sizes and/or aspect ratios of the plurality of rectangular sliding windows are different.

And, the preset scanning rule may be to scan the entire image sequentially from left to right and from top to bottom at a constant speed, or scan the entire image according to a random movement rule, or scan the entire image in an order specified by the user.

Other technical features are described in the previous embodiments and will not be repeated here.

In the above description, the disclosure of the application is not intended to limit itself in these respects. Rather, the various components may be selectively and operatively combined in any number within the intended scope of this disclosure. Additionally, terms like "comprising", "including" and "having" should by default be construed as inclusive or open, rather than exclusive or closed, unless explicitly defined to the contrary. All technical, scientific or other terms have the meaning as understood by those skilled in the art unless they are defined to the contrary. Common terms found in dictionaries should not be interpreted too ideally or too practically in the context of related technical documents, unless this disclosure explicitly defines them as such. Any changes and modifications made by those of ordinary skill in the field of the application according to the above disclosure fall within the protection scope of the claims.

What is claimed is:

1. A method for improving video object detection performance in surveillance edge computing, the method comprising:
   determine the size of multiple rectangular sliding windows for scanning according to the input size of the object detection neural network algorithm and the size of the original input image, the rectangular sliding windows can be moved to different positions on the original input image frame by frame according to preset scanning rules;
   when each frame is detected, the original input image and the sub-images in each rectangular sliding window are scaled in different proportions, and the resolution of the scaled original input image is lower than that of the scaled sliding window sub-images;
   stitching the scaled images into a rectangular image and using it as a detection input image;
   the detection is performed by an object detection neural network algorithm corresponding to the size of the detection input image;
   wherein, the steps of determining the size of multiple rectangular sliding windows for scanning according to the input size of the object detection neural network algorithm and the original input image size are as follows:
   step 110, determine the input size of the object detection neural network algorithm used according to the computing power of the current equipment, and the minimum detection size and maximum detection size of the object that the algorithm can detect under the corresponding input size;
   step 120, according to the input size, the input rectangle of the detection neural network algorithm is divided into a plurality of rectangular sub-image areas, each rectangular sub-image area is greater than or equal to the minimum detection size that the algorithm can detect; the rectangular sub-image area includes a full-image mapping sub-image area and the sliding window mapping sub-image area, the aspect ratio of the full-image mapping sub-image area is the same as the aspect ratio of the original input image for displaying the original input image reduced to a low resolution, and the sliding window mapping sub-image area is used to display the corresponding sliding window sub-image;
   wherein, the segmentation steps of each rectangular sub-image area are as follows:
   step 121, determine the size of the full-image map sub-image area on the input rectangle of the detection algorithm, comprising: according to the size of the object with the closest detection distance L0 on the original input image, select an initial scaling ratio so that the scaled size of the closest object on the original input image is less than or equal to the maximum detection size that the algorithm can detect, so the closest object can be detected on the full-image mapping sub-image area, and at the same time, enough space is left for each sliding window mapping sub-image area, after the scaling ratio is determined, the farthest detection distance L1 that can be detected in the full-image map area is also determined;
   step 122, in the remaining space, select a rectangular size area as a sliding window mapping sub-image area, so that the object at the distance L1 on the original input image can fall within the sliding window mapping sub-image area after being scaled, and can be detected by the detection algorithm; adjust the scale ratio so that the object with the farthest detection distance L2 on the original input image can be detected;
   step 123, repeat step 122 to determine the size of other sliding window mapping sub-image areas, and the farthest detection distance is gradually expanded until there is no suitable space to be set as the sliding window mapping sub-image area;
   step 124, repeat step 121 to 123 to adjust the size of each rectangular sub-image area and the corresponding scale ratio to maximize the detection distance.

2. The method according to claim 1, further comprising:
merging and mapping the detection results of each sliding window sub-image onto the original input image.

3. The method according to claim 1, further comprising:
in step 122, the time for the object with the farthest detection distance L2 to stay on the original image is longer than one round of scanning time of the sliding window.

4. The method according to claim 1, further comprising:
the sizes and/or aspect ratios of the plurality of rectangular sliding windows are different;

and, the preset scanning rule is to scan the whole image at a constant speed from left to right and from top to bottom, or scan the whole image according to a random movement rule, or scan the whole image in an order specified by the user.

5. The method according to claim 4, further comprising: acquire the detection results of each sliding window sub-image, and adaptively adjust the moving speed and/or the dwell time during scanning of the rectangular sliding window according to the detection results.

6. An apparatus for improving video object detection performance in surveillance edge computing, comprising:
a sliding window setting unit configured to determine the size of multiple rectangular sliding windows according to the input size of the object detection neural network algorithm and the original input image size, the rectangular sliding window can be moved to different positions on the original input image by frame according to the preset scanning rule;
an image preprocessing unit connected with the sliding window setting unit, the image preprocessing unit is configured to scale the original input image and the sliding window sub-images in each rectangular sliding window according to different proportions, the resolution of the scaled original input image is lower than that of the sliding window sub-images, and splicing each scaled image into a rectangular input image and use it as a detection input image;
an object detection unit connected with the sliding window setting unit and the image preprocessing unit, the object detection unit is configured to detect the detection input image by using the object detection neural network algorithm corresponding to the input scale;
the sliding window setting unit, including an input size determining unit and a rectangular sub-image area dividing unit,
wherein the input size determination unit is configured to: determine the input size of the object detection neural network algorithm adopted according to the computing power of the current device, and the minimum detection size and the maximum detection size that the algorithm can detect the object under the corresponding input size;
and the rectangular sub-image area dividing unit is configured to: according to the input size, divide the input rectangle of the detection neural network algorithm into a plurality of rectangular sub-image areas, each rectangular sub-image area is greater than or equal to the minimum detection size that can be detected by the algorithm; the rectangular sub-image area includes a full-image mapping sub-image area and some sliding-window mapping sub-image areas; the aspect ratio of the full-image mapping sub-image area is the same as that of the original input image for displaying the original input image reduced to a low resolution, the sliding window mapping sub-image area is used to display the corresponding sliding window sub-image;
wherein, the segmentation steps of each rectangular sub-image area are as follows:
step 121, determine the size of the full-image map sub-image area on the input rectangle of the detection algorithm, comprising: according to the size of the object with the closest detection distance L0 on the original input image, select an initial scaling ratio so that the scaled size of the closest object on the original input image is less than or equal to the maximum detection size that the algorithm can detect, so the closest object can be detected on the full-image mapping sub-image area, and at the same time, enough space is left for each sliding window mapping sub-image area, after the scaling ratio is determined, the farthest detection distance L1 that can be detected in the full-image map area is also determined;
step 122, in the remaining space, select a rectangular size area as a sliding window mapping sub-image area, so that the object at the distance L1 on the original input image can fall within the sliding window mapping sub-image area after being scaled, and can be detected by the detection algorithm; adjust the scale ratio so that the object with the farthest detection distance L2 on the original input image can be detected;
step 123, repeat step 122 to determine the size of other sliding window mapping sub-image areas, and the farthest detection distance is gradually expanded until there is no suitable space to be set as the sliding window mapping sub-image area;
step 124, repeat step 121 to 123 to adjust the size of each rectangular sub-image area and the corresponding scale ratio to maximize the detection distance.

7. The apparatus according to claim 6, further comprising: a result display unit configured to combine and map the detection results of each sliding window sub-image to the original input image to display the output.

8. The apparatus according to claim 6, further comprising: the sizes and/or aspect ratios of the plurality of rectangular sliding windows are different;
and, the preset scanning rule is to scan the whole image at a constant speed from left to right and from top to bottom, or scan the whole image according to a random movement rule, or scan the whole image in an order specified by the user.

* * * * *